United States Patent [19]
Yashiro et al.

[11] Patent Number: 6,108,694
[45] Date of Patent: Aug. 22, 2000

[54] MEMORY DISK SHARING METHOD AND ITS IMPLEMENTING APPARATUS

[75] Inventors: Hiroshi Yashiro, Kawasaki; Hideki Murayama, Kunitachi; Hirofumi Fujita, Yokohama; Takehisa Hayashi, Sagamihara; Masahiro Kitano, Hiratsuka, all of Japan

[73] Assignee: Hitachi, Ltd., Tokyo, Japan

[21] Appl. No.: 09/193,852

[22] Filed: Nov. 18, 1998

Related U.S. Application Data

[63] Continuation-in-part of application No. 08/670,757, Jun. 21, 1996, Pat. No. 5,935,205.

[30] Foreign Application Priority Data

Jun. 22, 1995 [JP] Japan ..................................... 7-155762
Nov. 19, 1997 [JP] Japan ..................................... 9-317855

[51] Int. Cl.[7] ............................. G06F 13/38; G06F 15/17
[52] U.S. Cl. ............................ 709/216; 709/213; 710/27
[58] Field of Search ................................... 709/213, 236, 709/238, 216; 370/395, 412, 427; 711/149; 710/27

[56] References Cited

U.S. PATENT DOCUMENTS

| | | | |
|---|---|---|---|
| 5,457,679 | 10/1995 | Eng et al. ............................... | 370/395 |
| 5,526,352 | 6/1996 | Min et al. ............................... | 370/395 |
| 5,555,244 | 9/1996 | Gupta et al. ............................ | 370/397 |
| 5,613,069 | 3/1997 | Walker ................................... | 709/236 |
| 5,745,710 | 4/1998 | Clanton, III et al. ..................... | 348/7 |
| 5,935,205 | 8/1999 | Murayama et al. ..................... | 709/206 |

FOREIGN PATENT DOCUMENTS 9-6706   1/1997   Japan .

OTHER PUBLICATIONS

N.P. Krnenberg et al.; "The VAXcluster Concept: An Overview of a Distributed System"; Digital Technical Journal, No. 5, Sep. 1997.
R. Snively; "Implementing a Fibre Channel SCSI Transport"; IEEE, 1994.
G.F. Coulouris et al.; Case Studies in Distributed System Design; Addison–Wesley Publishing Co.; Chapter 10, 1988.
E. Solari et al.; PCI Hardware and Software; Annabooks; pp. 15–17, 1998.
D.E. Comer; Internetworking with TCP/IP; Prentice–Hall; pp. 94–95, 1991.
H. M. Deitel, An Introduction to Operating Systems, Addison–Wesley, 1990, pp. 375–376.
U.S. application No. 08/670,757 filed Jun. 21, 1996.

*Primary Examiner*—Mark H. Rinehart
*Attorney, Agent, or Firm*—Antonelli, Terry, Stout & Kraus, LLP

[57] ABSTRACT

A memory disc sharing method in which a plurality of computers share a memory disc through a network, wherein a command in accordance with which the memory disc is accessed is received by a network interface apparatus, and when a requested computer to which a request of the command has been made is any of other computers, the command is transmitted to the any of other computers, and when the requested computer is a computer concerned, the command is stored in a memory disc command queue. The network interface apparatus retrieves the command from the memory disc command queue, and executes the processing of reading out/writing data from/to the memory disc in the computer concerned when a requesting computer from which a request of the command has been made is the computer concerned, and carries out the data transfer between the memory disc in the computer concerned and the requesting computer when the requesting computer is any of other computers.

19 Claims, 9 Drawing Sheets

FIG. 2

| VIRTUAL RAM DISC IDENTIFIER | RAM DISC MANAGEMENT COMPUTER ID | RAM DISC IDENTIFIER | START ADDRESS | SIZE |
|---|---|---|---|---|
| 1 | COMPUTER 1 | 1 | 8000 | 400 |
| 2 | COMPUTER 2 | 2 | 0 | 0 |

| VIRTUAL RAM DISC IDENTIFIER | COMMAND /DATA | ERROR INFORMATION STORING ADDRESS | ERROR INFORMATION SIZE |
|---|---|---|---|

| read/ write | REQUESTING BUFFER ADDRESS | DISC ADDRESS | DATA SIZE |
|---|---|---|---|

| REQUESTING COMPUTER ID | REQUESTED COMPUTER ID | REQUESTED COMPUTER DISC IDENTIFIER | COMMAND /DATA | SEQUENCE NUMBER |
|---|---|---|---|---|

501, 502, 503, 504, 505, 500

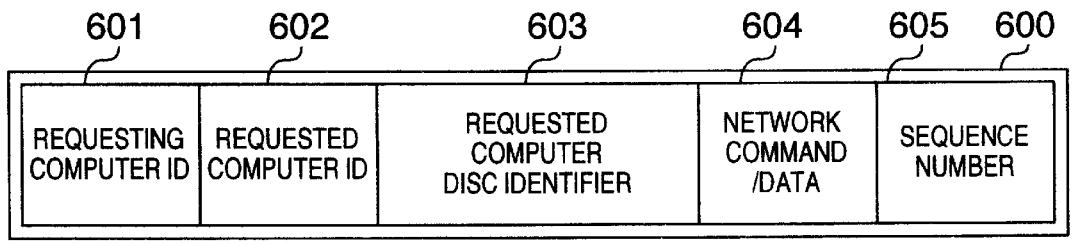
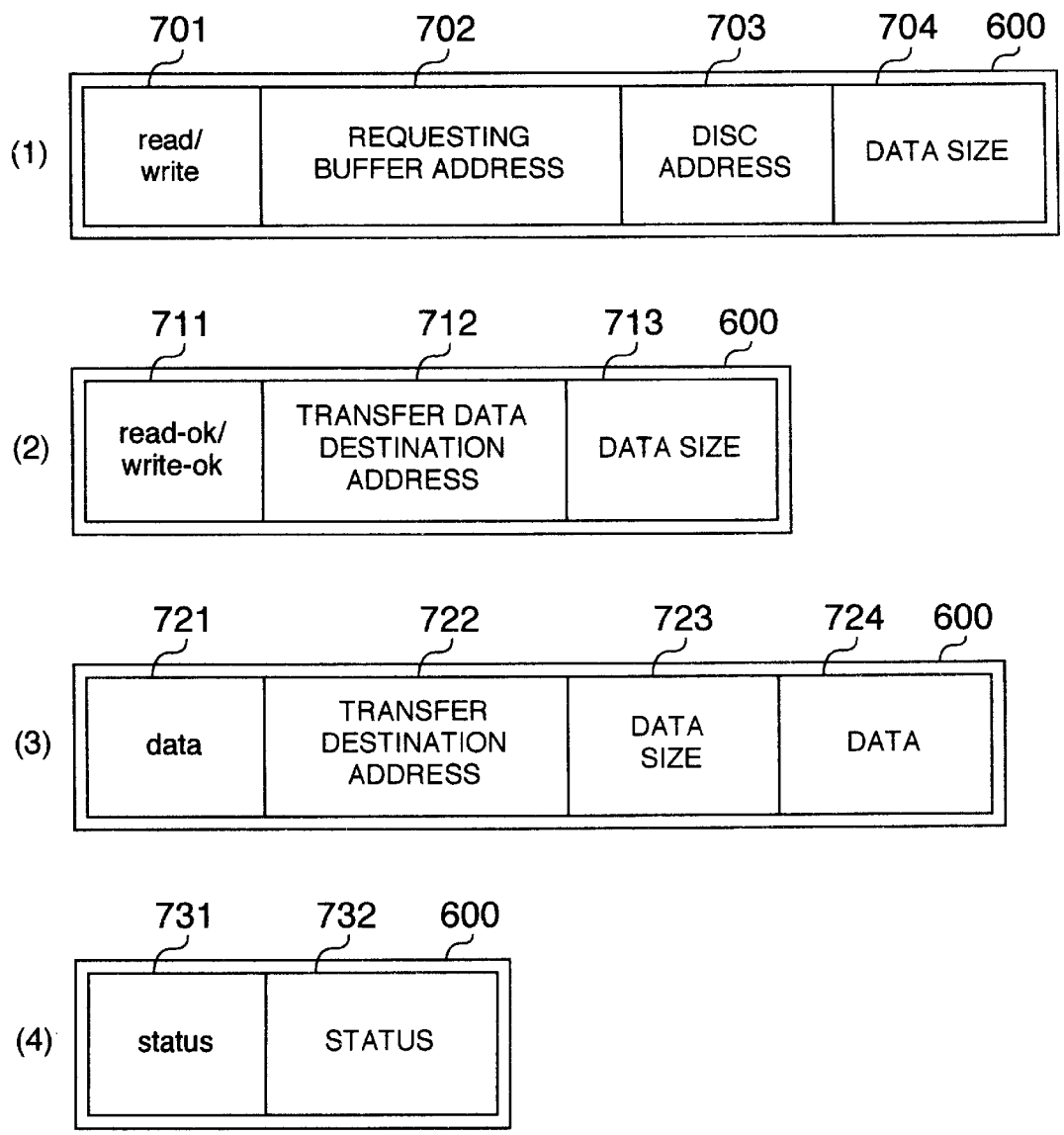

MEMORY DISK SHARING METHOD AND ITS IMPLEMENTING APPARATUS

CROSS REFERENCE TO RELATED APPLICATIONS

This application is a continuation-in-part of U.S. patent application Ser. No. 08/670,757, now U.S. Pat. No. 5,935, 205, entitled A COMPUTER SYSTEM HAVING A PLURALITY OF COMPUTERS EACH CONTROLLING ACCESS TO SHARED MEMORY BASED ON STRUCTURAL DEFINITION INFORMATION filed on Jun. 21, 1996 by H. Murayama et.al., the disclosure of which is incorporated therein by reference.

BACKGROUND OF THE INVENTION

1. Field of the Invention

The present invention relates in general to a memory disc sharing method in which a plurality of computers share a memory disc, and more particularly to a memory disc sharing method and a system implementing the same in which in loosely coupled computer systems which are connected to each other through a network, a plurality of computers share a high speed RAM disc with high efficiency.

2. Description of the Related Art

Heretofore, there is well known the technology, called a RAM disc, which utilizes as a disc a memory such as a high speed RAM. This technology can be realized in such a way that a part of the high speed RAM is made an area regarded as a disc, and an emulator program is proposed which accesses to that area through the same interface as that of the disc.

This RAM disc is, for example, described in H. M. Deitel, "An Introduction to Operating Systems", Second Edition, 1990, Addition-Wesley Publishing Company (ISBN 0-2101-18038-3), pp. 375 to 376.

In order that RAM discs dispersed to computers may be held in common through a network, there is required the technology called a network file system. This network file system is introduced as an NFS in the above-mentioned article of "An Introduction to Operating Systems", pp. 601 to 602.

SUMMARY OF THE INVENTION

In the method of utilizing the NFS when sharing the conventional RAM disc by a plurality of computers, there arises the problem that since after having copied, whenever accessing to the RAM disc of another computer, the contents of the RAM disc of interest to a memory area of a main memory which is an object of the processing by the NFS, the contents of the RAM disc of interest are transferred to a memory area which is used as a RAM disc, the execution efficiency is poor. In particular, if the capacity of the RAM disc is increased, it will cause much time over copying the contents of the data by the program of the NFS, which is not suitable for the shared use of the large capacity RAM disc.

In addition, when the RAM disc is shared as the normal disc through the NFS program, since the RAM disc in a computer concerned is also connected thereto through the NFS program, there arises the problem that even when accessing to the RAM disc in the computer concerned, the data transfer through the NFS program takes time.

In the light of the foregoing, the present invention was made in order to solve the above-mentioned problems associated with the prior art, and it is therefore an object of the present invention to provide the technology which is capable of enhancing the efficiency of transferring data in a memory disc which is shared by a plurality of computers.

It is another object of the present invention to provide the technology which is capable of enhancing, when a plurality of computers share a memory disc in a computer concerned, the efficiency of accessing the memory disc in the computer concerned.

It is still another object of the present invention to provide the technology which is capable of suppressing, in the data transfer between a memory disc of a computer concerned and a requesting computer from which a request has been made, the buffer amount which becomes necessary on a network interface apparatus.

It is yet another object of the present invention to provide the technology which is capable of saving the memory capacity of a main memory by suppressing the processing load of a computer concerned.

In order to solve the above-mentioned problems associated with the prior art, according to the present invention, there is provided a memory disc share system in which a plurality of computers share a memory disc through a network, wherein the processing of reading out/writing data from/to a memory disc in a computer concerned, and the data transfer between the memory disc of the computer concerned and a requesting computer from which a request has been made are carried out under the control made by a network interface apparatus.

In the memory disc share system according to the present invention, the network interface apparatus accepts a command in accordance with which the memory disc is accessed.

The network interface apparatus checks the contents of the command which has been accepted and then stores, when the requested computer for which an access has been requested is the computer concerned, the command of interest in a memory disc command queue, and transmits, when the requested computer for which an access has been required is any of other computers, the command of interest to the any of other computers.

Next, the network interface apparatus retrieves a command from the memory disc command queue, and then executes, when the requested computer from which the command thus retrieved has been requested is the computer concerned, the processing of reading out/writing data from/to the memory disc in the computer concerned. On the other hand, when the requesting computer from which the command thus retrieved has been requested is any of other computers, the network interface apparatus carries out the data transfer between the memory disc of the computer concerned and the requesting computer from which a request has been made.

On the basis of the processing executed by this network interface apparatus, since the memory disc seems from the operating system to be present on the network interface apparatus, the memory disc can be shared by a plurality of computers. In addition, since the network interface apparatus executes the processing of accessing to the memory disc, it is possible to reduce load with which the processor on the computer is burdened.

Since the processing of accessing to the memory disc is executed under the control made by the network interface apparatus, the access from the network interface apparatus to the memory disc is directly carried out without copying once the contents of the memory disc to the main memory in a manner as in the above-mentioned conventional method utilizing the NFS, and hence it is possible to enhance the execution efficiency.

In addition, since when accessing to the memory disc of the computer concerned, the processing of reading out/ writing data from/to the memory disc in the computer concerned without through the network, it is possible to carry out efficiently the data transfer of interest.

As described above, according to the present invention, since under the control made by the network interface apparatus, the transfer of the data in the memory disc is carried out without through the buffer area in the main memory, it is possible to enhance the efficiency of transferring the data in the memory disc which a plurality of computer share.

BRIEF DESCRIPTION OF THE DRAWINGS

The above and other objects as well as advantages of the present invention will become clear by the following description of the preferred embodiments of the present invention with reference to the accompanying drawings, wherein:

FIG. 2 is a diagram showing one example of a RAM disc structure information holding block 157;

FIG. 3 is a diagram showing an example of a format of a disc command which is accepted at a command acceptance block 152;

FIG. 4 is a diagram showing an example of a format of a command/data 302 within a disc command 300;

FIG. 5 is a diagram showing an example of a format of a RAM disc command which is stored in a RAM disc command queue 155;

FIG. 6 is a diagram showing an example of a network packet;

FIG. 7 is a diagram showing examples of a format every command of a network command/data 604;

DETAILED DESCRIPTION OF THE PREFERRED EMBODIMENTS

The description will hereinafter be given with respect to a memory disc share system, according to one embodiment of the present invention, with which a high speed RAM disc is shared by loose coupling computer systems which are connected to each other through a network.

Figure 1:
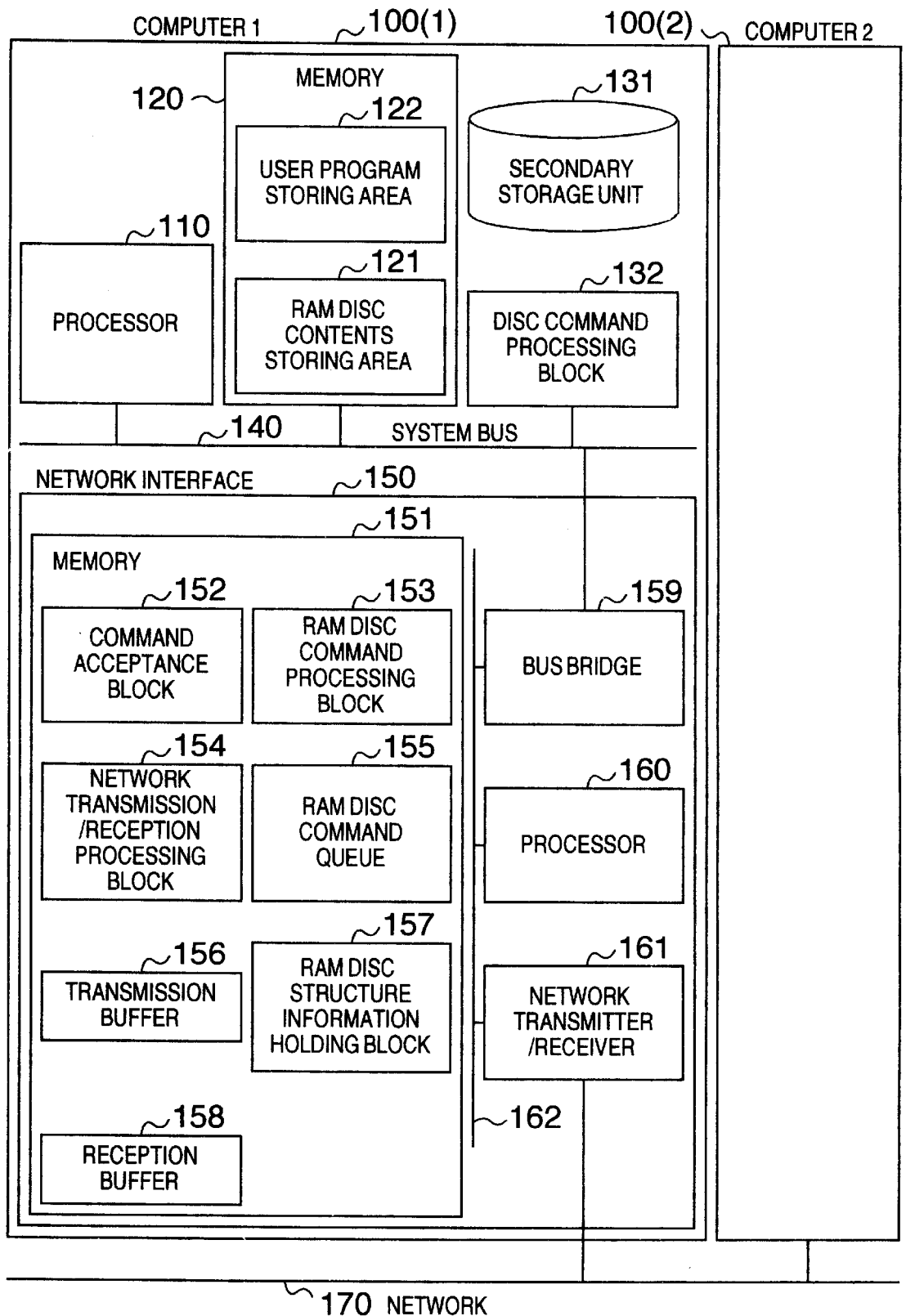
FIG. 1 is a block diagram showing a configuration of a memory disc share system according to a first embodiment of the present invention.

FIG. 1 is a block diagram showing a configuration of a memory disc share system according to a first embodiment of the present invention. A computer 100 includes, as shown in FIG. 1, a processor 110, a memory 120, a secondary storage unit 131, a disc command processing block 132, a system bus 140, and a network interface 150.

The processor 110 is the processor which serves to control the overall operation of the computer 100. The memory 120 is the storage unit for storing therein the contents of a RAM disc and a user program. The secondary storage unit 131 is the unit connected to the disc command processing block 132 for storing therein various kinds of processing programs and data.

The disc command processing block 132 is the processing block for processing a disk command to be issued to the secondary storage unit 131. The system bus 140 is the bus through which the processor 110, the memory 120, the disc command processing block 132 and the network interface 150 are connected to one another. The network interface 150 is the apparatus for reading out/writing data/from to the RAM disc which is present in a computer concerned (computer 1 in FIG. 1) or any of other computers (computer 2 in FIG. 1).

The memory 120 includes an area 121 in which the contents of the RAM disc are stored, and an area 122 in which the user program is stored.

The RAM disc contents storing area 121 is the area in which the contents of the RAM disc are stored, and the user program storing area 122 is the area in which the user program is stored.

The network interface 150 includes a memory 151, a bus bridge 159, a processor 160, a network transmitter/receiver 161, and a local bus 162.

The memory 151 is the storage unit which serves to load a command acceptance block 152, a RAM disc command processing block 153 and a network transmission/reception processing block 154, and which has a RAM disc command queue 155, a transmission buffer 156, a reception buffer 158 and a RAM disc structure interface holding block 157.

The bus bridge 159 is, for example, as described in an article of "Open Design", CQ Publishing Company, No. 7, March, 1995, pp. 10 to 14, the circuit having the function of transferring the data relating to the contents of the memory between the memory 151 of the network interface 150 and the memory 120 which is directly connected to the system bus 140.

The processor 160 is the processor which serves to read out the contents of the memory 151 in the form of instruction strings or data, and also to control both of the network transmitter/receiver 161 and the bus bridge 159. The network transmitter/receiver 161 is the circuit which serves to transmit/receive the network packet to/from another computer through the network 170. The local bus 162 is the bus through which the memory 151, the bus bridge 159, the processor 160 and the network transmitter/receiver 161 are connected to one another.

In addition, the network interface 150 includes the command acceptance block 152, the RAM disc command processing block 153, and the network transmission/reception processing block 154.

The command acceptance block 152 is the processing block which serves to accept a disc command through the path extending from the processor 110 connected to the system bus 140 to the bus bridge 159, and to number the disc command thus accepted with the sequence numbers which are included in the inside of the command acceptance block 152 and also to store therein the disc command thus accepted as the RAM disc command in the RAM disc command queue 155 or to transmit the disc command thus accepted to another computer through the transmission buffer 156 and the network transmitter/receiver 161 in accordance with whether or not a requested computer to which a request has been made is the computer concerned on the basis of the information in the RAM disc structure information holding block 157.

The RAM disc command processing block 153 is the processing block which serves to retrieve the RAM disc command from the RAM disc command queue 155 and to read out/write data from/to the RAM disc in the computer concerned or to transmit data between the RAM disc in the computer concerned and the requesting computer from which a request has been made in accordance with whether or not the requesting computer from which a request has been made for the RAM disc command thus retrieved is the computer concerned.

The network transmission/reception processing block 154 is the processing block which serves to receive a network packet from any of other computers through the network 170 and to carry out the storage of the RAM disc command in the RAM disc command queue 155, the write-ok processing, the read-ok processing or the processing of setting status information in accordance with the kind of network packet thus received.

As for the method of making the network interface 150 operate as the command acceptance block 152, the RAM disc command processing block 153 and the network transmission/reception processing block 154, there is adopted the method wherein the programs for making those blocks operate may be executed by the processor 160, or those blocks may be constructed in the form of hardware. In this connection, when those blocks are constructed in the form of programs, those programs may be recorded in a storage medium such as a RAM or the like, or may be recorded in any other medium other than the RAM. In addition, when those programs are previously installed in a hard disc or the like, those programs as the source of installation may be recorded in the form of programs in a FD, a CD-ROM or the like, or may be transferred through the network.

In addition, the network interface 150 further includes the RAM disc command queue 155, the transmission buffer 156, the RAM disc structure information holding block 157 and the reception buffer 158.

The RAM disc command queue 155 is the queue which serves to store therein the accepted RAM disc commands and to process the accepted RAM disc commands in the first-in first-out (FIFO) manner. The transmission buffer 156 is the buffer for storing therein temporarily the network packet which is to be transmitted.

The RAM disc structure information holding block 157 is the buffer exhibiting in which RAM disc management computer the RAM disc contents storing area 121 in the RAM disc specified by the RAM disc command is present. The reception buffer 158 is the buffer for storing therein temporarily the network packet which has been received.

The network 170 is the telecommunication network channel through which a plurality of computers 100 each of which operates to access to the RAM disc are connected, and through which the network packets which are transmitted/received by a plurality of computers 100 are transferred.

In the memory disc share system according to the present embodiment, a plurality of computers 100 are connected to the network 170, and the processor 110, the memory 120, the disc command processing block 132 and the network interface 150 of each of the computers 100 are connected to one another through the system bus 140.

The memory disc share system of the present embodiment operates in such a way that the program stored in the user program storing area 122 issues a command to the network interface 150 to execute the processing of reading out/writing data from/to the RAM disc which is present in the computer concerned (computer 1) or any of other computers (computer 2).

In addition, the request to execute the processing of reading out/writing the contents from/to the RAM disc in the computer concerned from which a request has been made, and the request to execute the processing of reading out/writing the contents from to the RAM disc in the computer concerned to which a request has been made from the network interface 150 are ordered so as not to compete with each other, and also until one read request and one write request have been completed, any of other read requests and any of other write requests are not be executed at all.

Such an ordering function is the function which is required when a plurality of programs share the RAM disc contents storing area 121. If a plurality of read requests and write requests may be executed simultaneously, then how much the contents of the disc are changed will be different depending on timing.

In the memory disc share system of the present embodiment, by carrying out the ordering in read/write requests, the exclusive control which is required for the shared use of a plurality of programs can be realized, and also in the network interface 150 shown in FIG. 1, the above-mentioned exclusive control can be carried out.

The command which is accepted at the command acceptance block 152 is realized in the same format as that of the command which is accepted at the disc command processing block 132. In this connection, the details of the processing flow in the command acceptance block 152 will be described later with reference to FIG. 8.

In addition, the details of the processing flow in the RAM disc command processing block 153 will be described later with reference to FIGS. 9 to 11, and also the details of the processing flow in the network transmission/reception processing block 154 will be described later with reference to FIGS. 12 to 14.

In the memory disc share system of the present embodiment, by provision of the RAM disc command queue 155, it is possible to order the accesses from the computer concerned and another computer to the RAM disc, and it can be judged, by the RAM disc structure information holding block 157, in which computer the substance of the RAM disc is held, and also the access to the RAM disc of another computer becomes possible.

FIG. 2 is a diagram showing one example of the RAM disc structure information holding block 157 of the "computer 1". As shown in FIG. 2, the RAM disc structure information holding block 157 of the present embodiment has a virtual RAM disc identifier 201, a ROM disc management computer ID 202, a RAM disc identifier 203, a start address 204 and size 205.

The virtual RAM disc identifier 201 is the identifier which is used to determine uniquely an entry of the RAM disc structure information holding block 157. The RAM disc management computer ID 202 is the identifier exhibiting the RAM disc management computer in which the substance of the RAM disc is present.

The RAM disc identifier 203 is the identifier which is used to determine uniquely the substance of the RAM disc on the RAM disc management computer. The start address 204 is the first address in the area on the memory 120 in which the substance of the RAM disc is present. The size 205 is the size of the area on the memory 120 in which the substance of the RAM disc is present.

In FIG. 2, the RAM disc which has "1" as the virtual RAM disc identifier 201 is present in the "computer 1" as the computer concerned, the substance thereof is represented by the identifier of "1", while the RAM disc which has "2" as the virtual RAM disc identifier 201 is present in the "computer 2" as any of other computers (i.e., the other computer 2 in FIG. 1), and also it is understood that the RAM disc identifier 203 is "2" on the "computer 2".

The RAM disc identifier 203 is used to determine uniquely the substance of the RAM disc on the RAM disc management computer and on the basis of a set of RAM disc management computer ID 202 and RAM disc identifier 203, the substance of the RAM disc is uniquely determined within the loosely coupled computer system of interest.

The start address 204 and the size 205 respectively represent the first address and the size of the area on the memory 120 in which the substance of the RAM disc is present, and hence in FIG. 2, it is meant that the RAM disc having "1" as the virtual RAM disc identifier 201 occupies 400 bytes with the address "8,000" as the start address. In this connection, the RAM disc having "2" as the virtual RAM disc identifier 201 is absent in the "computer 1", and hence the start address 204 and the size 205 thereof are both "0".

By using the above-mentioned RAM disc structure information holding block 157, it can be judged, by the network interface 150, in which location of the memory 120 the substance of the RAM disc is present, or in which RAM disc management computer the substance of the RAM disc is present in the case where the substance of the RAM disc is present in another computer.

In this connection, in the case where a plurality of RAM discs are provided in one computer, it can be judged, by the network interface 150, which RAM disc of which computer is of interest.

Next, the description will hereinbelow be given with respect to the structure of the data which is transmitted among the command acceptance block 152, the RAM disc command processing block 153 and the network transmission/reception processing block 154 with reference to FIGS. 3 to 7.

FIG. 3 is a diagram showing an example of a format of a disc command which is accepted at the command acceptance block 152 of the present embodiment. As shown in FIG. 3, a disc command 300 of the present embodiment has a virtual RAM disc identifier 301, a command/data 302, an error information storing address 303 and error information size 304.

The virtual RAM disc identifier 301 exhibits the identifier of the RAM disc on the basis of which the disc command 300 is executed, and also exhibits one of the virtual RAM disc identifiers 201 in the above-mentioned RAM disc structure information holding block 157.

The command/data 302 exhibits the contents of the command and data to the virtual RAM disc. The error information storing address 303 exhibits the address to which error information of the disc command 300 is written after completion of the execution of the disc command 300. Also, the error information 304 exhibits the size of the memory area to which the error information is written.

FIG. 4 is a diagram showing an example of a format of the command/data 302 within the disc command 300 of the present embodiment. As shown in FIG. 4, the command/data 302 of the present embodiment has a command kind 401, a requesting buffer address 402, a disc address 403 and data size 404.

The command kind 401 is the information exhibiting a kind of command of interest such as "read" or "write". The requesting buffer address 402 exhibits the start address of the buffer from which the command of interest has been requested. That is, when the command kind 401 is "read", the requesting buffer address 402 exhibits the start address of the data area to which the result of reading out the data is returned back, while when the command kind 404 is "write", the requesting buffer address 402 exhibits the start address of the data area to which the data is written.

The disc address 403 exhibits the offset address of the RAM disc as the destination of request from/to which the data is read out/written in accordance with the command of interest. Also, the data size 404 exhibits the size of the data which is read out/written in accordance with the command of interest.

FIG. 5 is a diagram showing an example of a format of a RAM disc command which is stored in the RAM disc command queue 155. As shown in FIG. 5, a RAM disc command 500 of the present embodiment has a requesting computer ID 501, a requested computer command ID 502, a requested computer disc identifier 503, a command data 504, and a sequence number 505.

The requesting computer ID 501 is the identifier exhibiting the requesting computer from which a request to execute the processing for the RAM disc has been made. The requested computer ID 502 is the identifier exhibiting the requested computer which holds the requested RAM disc. The requested computer disc identifier 503 is the identifier on the basis of which the substance of the RAM disc is uniquely determined on the requested computer represented by the requested computer ID 502, and exhibits the RAM disc identifier 203 of the RAM disc structure information holding block 157.

The command/data 504 is the same as the command/data 302 which has been described with reference to FIG. 4, and hence exhibits the contents of the command and the data to the RAM disc. The sequence number 505 is the number exhibiting the number of reading/writing requests made by the computer concerned in the command acceptance block 152.

The RAM disc commands 500 are stored in the RAM disc command queue 155 through the command acceptance block 152 and the network transmission/reception processing block 154, and then are retrieved in the order of storage by the RAM disc command processing block 153. Then, the processing will be executed in accordance with the format of the RAM disc command 500.

In addition, by making, every sequence number 505, the error information storing address 303 correspond thereto, the error information can be returned back to the user program.

FIG. 6 is a diagram showing an example of a format of a network packet of the present embodiment. As shown in FIG. 6, a network packet 600 of the present embodiment has a requesting computer ID 601, a requested computer ID 602, a requested computer disc identifier 603, a network command/data 604 and a sequence number 605.

The requesting computer ID 601 is the identifier exhibiting the requesting computer from which a network packet 600 has been transmitted. The requested computer ID 602 is the identifier exhibiting the requested computer which receives the network packet 600.

The requested computer identifier 603 is the identifier on the basis of which the substance of the RAM disc is uniquely determined on the requested computer represented by the requested computer ID 602. The network command/data 604 exhibits the contents of the command and the data of the network packet 600. Also, the sequence number 605 is the number exhibiting the number of network packets 600, and hence has the same sense as that of the sequence number 505 in the RAM disc command 500.

The network packet 600 exhibits the packet which is stored in the reception buffer 158 through the path extending from the network 170 to the network transmitter/receiver 161, or the packet which is transmitted onto the network 170 through the path extending from the transmission buffer 156 to the network transmitter/receiver 161. In addition, the network command/data 604 has the formats corresponding to six kinds of commands, and will now be described in more detail with reference to FIG. 7.

FIG. 7 is a diagram showing examples of formats for commands of the network command/data 604 of the present embodiment. A kind of command 701 is information exhibiting that the command of interest is the command to instruct to execute the processing of reading out or writing data. The requesting buffer address 702 is the start address of the buffer of the requesting computer from which the request of the command of interest has been made.

A disc address 703 is an offset address of the RAM disc of the requested computer in which data is read out/written in accordance with the command of interest. Data size 704 is the size of the data which is read out/written in accordance with the command of interest.

A command kind 711 is information exhibiting that the command of interest is the command in accordance with which the response to reading or the response to writing is carried out. A transfer destination address 712 is a value of the requesting buffer address 702, and reports that the preparations of transferring the contents of the RAM disc from the requesting computer to the specified address have been completed. Data size 713 is size of the RAM disc for which the preparations for the data transfer have been completed.

A command kind 721 is information exhibiting that the command of interest is the command in accordance with which the data transfer is carried out. A transfer destination address 722 is an address exhibiting the destination of transfer of the data which is transferred in accordance with the command of interest. Data size 723 is size of the data which is transferred in accordance with the command of interest. Transfer data 724 is the contents of the RAM disc which are transferred in accordance with the command of interest.

A command kind 731 is information exhibiting that the command of interest is the command in accordance with which the result of execution of the command is reported. A status 732 is information exhibiting the result of execution of the command.

As for the network command/data 604, there are six network commands/data consisting of "read", "write", "read-ok", "write-ok", "data" and "status".

FIG. 7(1) shows the format of the commands "read" and "write". The format of the command "read" and "write" consists of the command kind 701, the requesting buffer address 702, the disc address 703 and the data size 704.

FIG. 2(2) shows the format of the command "read-ok" and "write-ok" which format includes the command kind 711, the transfer destination address 712 and the data size 713.

FIG. 7(3) shows the structure of the command "data" which includes the command kind 721, the transfer destination address 722, the data size 723 and the transfer data 724.

FIG. 7(4) shows the command "status" which includes the command kind 731 and the status 732.

Next, the description will hereinbelow be given, using the above-mentioned data structure, with respect to in what way the command acceptance block 152, the RAM disc command processing block 153 and the network transmission/reception processing block 154 are operated.

Figure 8:
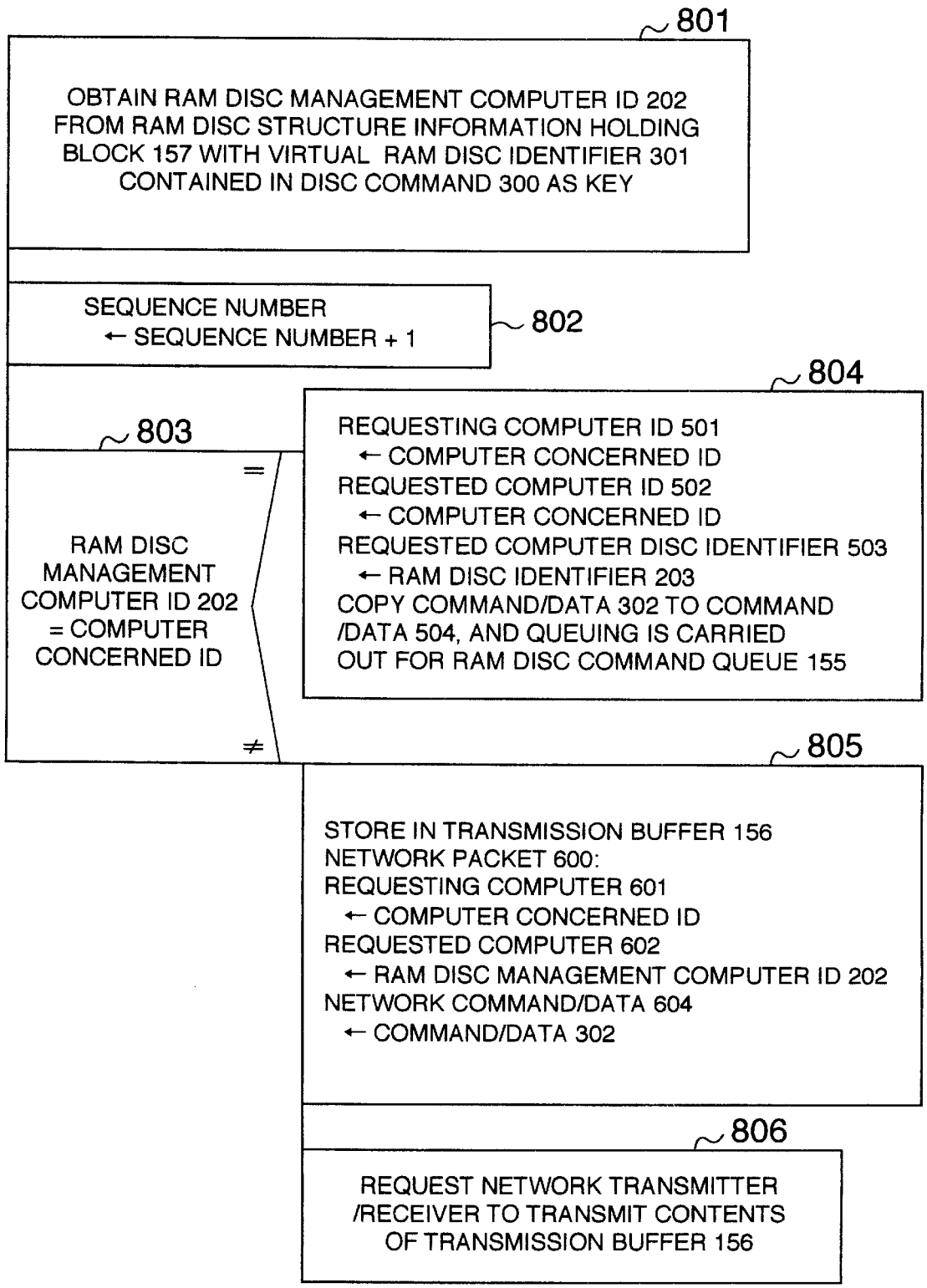
FIG. 8 is a PAD diagram (i.e., diagram representing an algorithm, and so forth) showing the processing flow in a command acceptance block 152.

FIG. 8 is a PAD diagram showing the processing flow in the command acceptance block 152 of the present embodiment. At the time when having accepted the disc command 300, first of all, in Step 801, the command acceptance block 152 obtains the RAM disc management computer ID 202 from the RAM disc structure information holding block 157 with the virtual RAM disc identifier 301 contained in the disc command 300 as a key.

Next, in Step 802, the sequence number in the command acceptance block 152 is increased by one to assign the sequence number 505 for the disc command 300 thus accepted.

In Step 803, it is judged whether or not the RAM disc management computer ID 202 which has been obtained in Step 801 is identical to the computer ID of the computer concerned.

If it is judged in Step 803 that the RAM disc management computer ID 202 obtained in Step 801 is identical to the computer ID of the computer concerned, then since the accepted disc command 300 is used to access to the RAM disc which the computer concerned holds, in Step 804, the RAM disc command 800 is produced and then the queuing is carried out for the RAM disc command queue 155.

More specifically, in Step 804, both of the requesting computer ID 501 and the requested computer ID 502 are made the computer IDs of the computer concerned, the requested computer disc identifier 503 is made the RAM disc identifier 203 which is stored in the RAM disc structure information holding block 157, and the command/data 302 is copied to the command/data 504, thereby producing the RAM disc command 500. Then, the RAM disc command 500 thus produced is queued to the RAM disc command queue 155 of the computer concerned.

For example, when the "computer 1" accepts the disc command 300, in which the virtual RAM disc identifier 301 is "1", with the contents of the RAM disc structure information holding block 157 shown in FIG. 3, since the RAM disc management computer ID 202 is "computer 1", "1" is selected as the requested computer disc identifier 503 of the ROM disc command 500.

On the other hand, if it is judged in Step 803 that the RAM disc management computer ID 202 is different from the computer ID of the computer concerned, then in Step 805, the network packet 600 is produced in which the requesting computer ID 601 is made the computer ID of the computer concerned, the requested computer ID 602 is made the RAM disc management computer ID 202, and the network command/data 604 is made the command/data 302, and then is stored in the transmission buffer 156.

Next, in Step 806, the command acceptance block 152 requests the network transmitter/receiver 161 to transmit the data relating to the contents of the transmission buffer 156 in which the network packet 600 produced in Step 805 is stored.

By using the RAM disc structure information holding block 157 in such a way, the request to the RAM disc which is present in any of other computers can be transferred to the computer 100 which manages the substance of the RAM disc.

Figure 9:
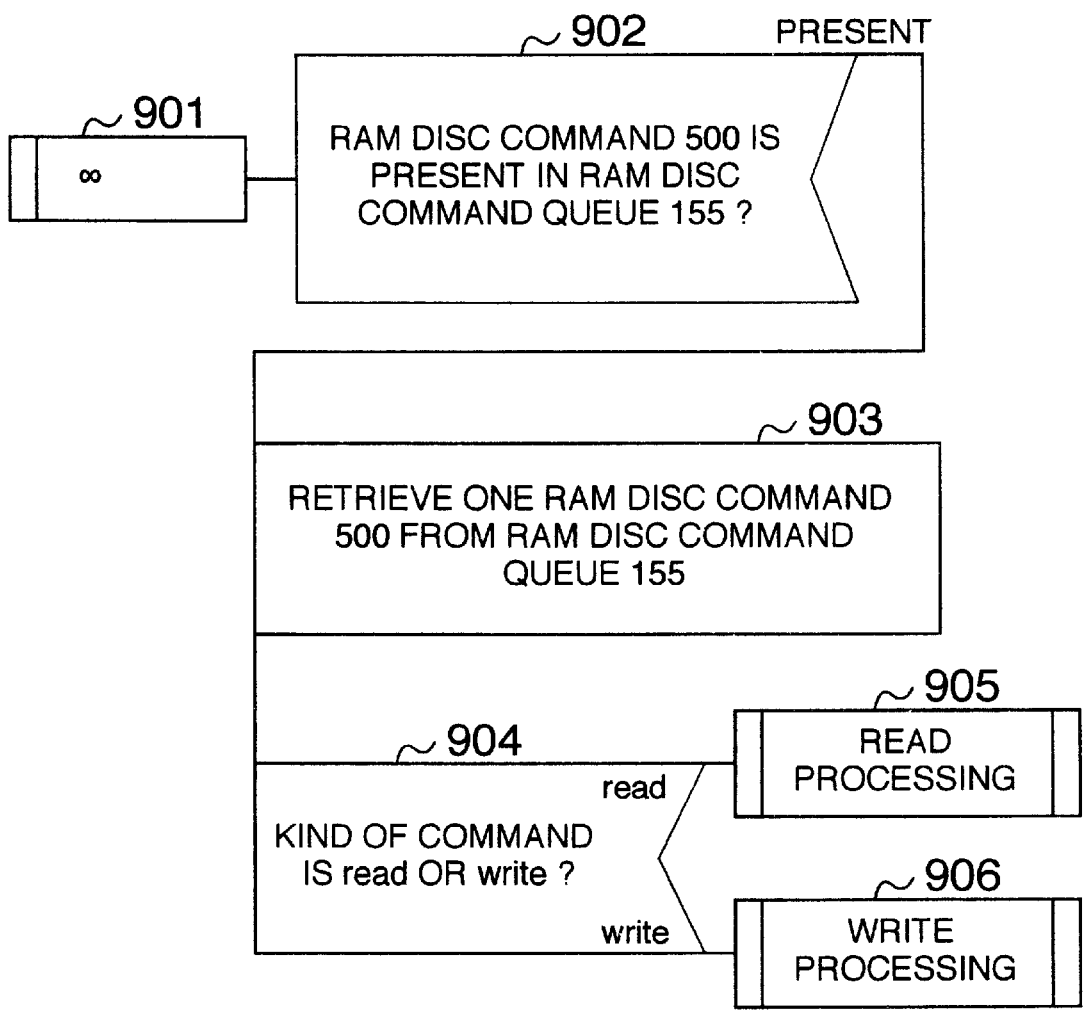
FIG. 9 is a PAD diagram showing the processing flow in a RAM disc command processing block 153.

FIG. 9 is a PAD diagram showing the processing flow in the RAM disc command processing block 153 of the present embodiment. As shown in Step 901, the RAM disc command processing block 153 includes an infinite loop of the processing shown in and after Step 902.

First of all, in Step 902, it is judged whether or not the RAM disc command 500 is present in the RAM disc command queue 155. If it is judged in Step 902 that the RAM disc command 500 is present in the RAM disc command queue 155, then in Step 903, one head RAM disc command 500 is retrieved from the RAM disc command queue 155.

Next, in Step 904, it is judged whether the kind of RAM disc command 500 thus retrieved is "read" or "write". If it is judged in Step 904 that the kind of RAM disc command 500 thus retrieved is "read", then the read processing in Step 905 is executed. On the other hand, if it is judged in Step 904 that the kind of RAM disc command 500 is "write", then the write processing in Step 906 is executed.

Now, the read processing in Step 905 and the write processing in Step 906 will hereinbelow be described in detail with reference to FIGS. 10 and 11, respectively.

Figure 10:
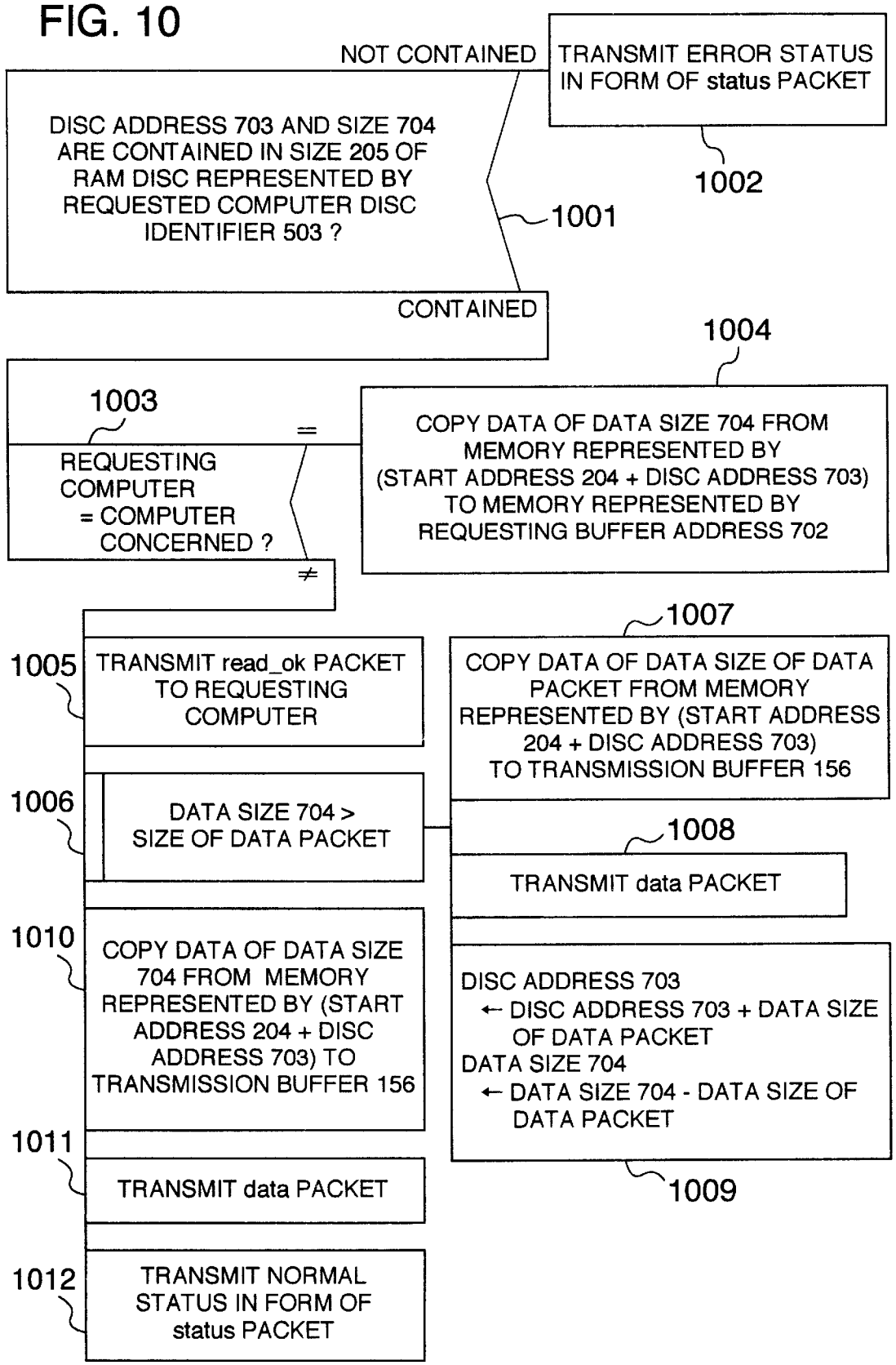
FIG. 10 is a PAD diagram showing the processing flow of the read processing in the RAM disc command processing block.

FIG. 10 is a PAD diagram showing the processing flow of the read processing in the RAM disc command processing block 153 of the present embodiment. First of all, in Step 1001, it is judged whether or not the disc address 703 and the data size 704 are contained in the size 205 of the RAM disc represented by the requested computer disc identifier 503.

The size 205 of the RAM disc is the information contained in the RAM disc structure information holding block 157, and the size 205 of the entry is used which matches the requested computer disc identifier 503 and the RAM disc identifier 203 of the RAM disc structure information holding block 157.

If it is judged in Step 1001 that the disc address 703 and the data size 704 are not contained in the size 205 of the RAM disc, then in Step 1002, the error status is transmitted. The error status is transmitted by storing the "status" packet shown in FIG. 7(4) in the transmission buffer 156 and then by requesting the network transmitter/receiver 161 to carry out the transmission.

On the other hand, if it is judged in Step 1001 that the disc address 703 and the data size 704 are contained in the size 205 of the RAM disc of interest, next in Step 1003, then it is judged whether or not the requesting computer ID 501 is the computer ID of the computer concerned.

If it is judged in Step 1003 that the requesting computer ID 501 exhibits the computer ID of the computer concerned, then the contents of the memory 120 may be copied within the computer concerned. More specifically, the data of the data size 704 is copied from the address represented by (the start address 204+ the disc address 703) to the address represented by the requesting buffer address 702.

On the other hand, if it is judged in Step 1003 that the requesting computer ID 501 does not exhibit the computer ID of the computer concerned, then the data relating to the contents of the RAM disc need to be transferred to any of other computers, and hence the processing in and after Step 1005 is executed.

First of all, in Step 1005, the "read-ok" packet is transmitted to the requesting computer represented by the requesting computer ID 501. By transmitting this packet, the preparations for the data transfer between the requesting computer and the requested computer are made.

The "read-ok" packet is the packet of the format shown in FIG. 7(2) and includes the transfer destination address 712 and the data size 713. As the transfer destination address 712, the value of the requesting buffer address 702 is returned back to report that the preparations for transfer of the contents of the RAM disc from the requesting computer to the specified address have been completed.

Next, in Step 1006, it is judged whether or not the value of the data size 704 is larger than the maximum length of the "data" packet.

The size of the network packet has the finite length, and in Ethernet as well known technology for example, as introduced in an article of "Network Construction-Principles•Protocol•Architecture by TCP/IP" written by D.Comer and translated by Jun Murai and Hiroyuki Kusumoto, Kyoritsu Publishing Company, 1990, p.54, and the like, 1,500 octets (one octet is 8 bits length) is the maximum length for one transfer.

For this reason, if the value of the data size 704 exceeds this maximum length, then it is required that the data is divided and the data transfer is carried out with a plurality of packets. Therefore, in Steps 1006 to 1011, the processing of dividing the packet is executed.

First of all, in Step 1006, it is judged whether or not the required data size 704 is larger than the maximum length of the "data" packet. If it is judged in Step 1006 that the data size 704 is larger than the maximum length of the "data" packet, then the processings in Steps 1007 to 1009 are executed.

In Step 1007, first of all, the contents of the data size 723 of the "data" packet are copied from the address represented by (the start address 204+ the disc address 703) to the transmission buffer 156. The data of interest is, in Step 1008, transferred as the "data" packet to the requesting computer. Next, in Step 1009, the values of the disc address 703 and the data size 704 are changed by the data size 723 of the "data" packet which has been transmitted.

By executing repeatedly the processings from Step 1007 to Step 1009, it is possible to transfer of the data which is larger than the maximum length of the "data" packet.

In addition, in Steps 1010 and 1011, the transfer data 724 which is smaller than the maximum length of the "data" packet is transferred.

In Step 1012, in order that it may be reported that all of the data transfer has been completed, the "status" packet is transferred in which the information exhibiting the normal completion is stored in the status 732. By executing the above-mentioned processings, the read processing has been completed.

Figure 11:
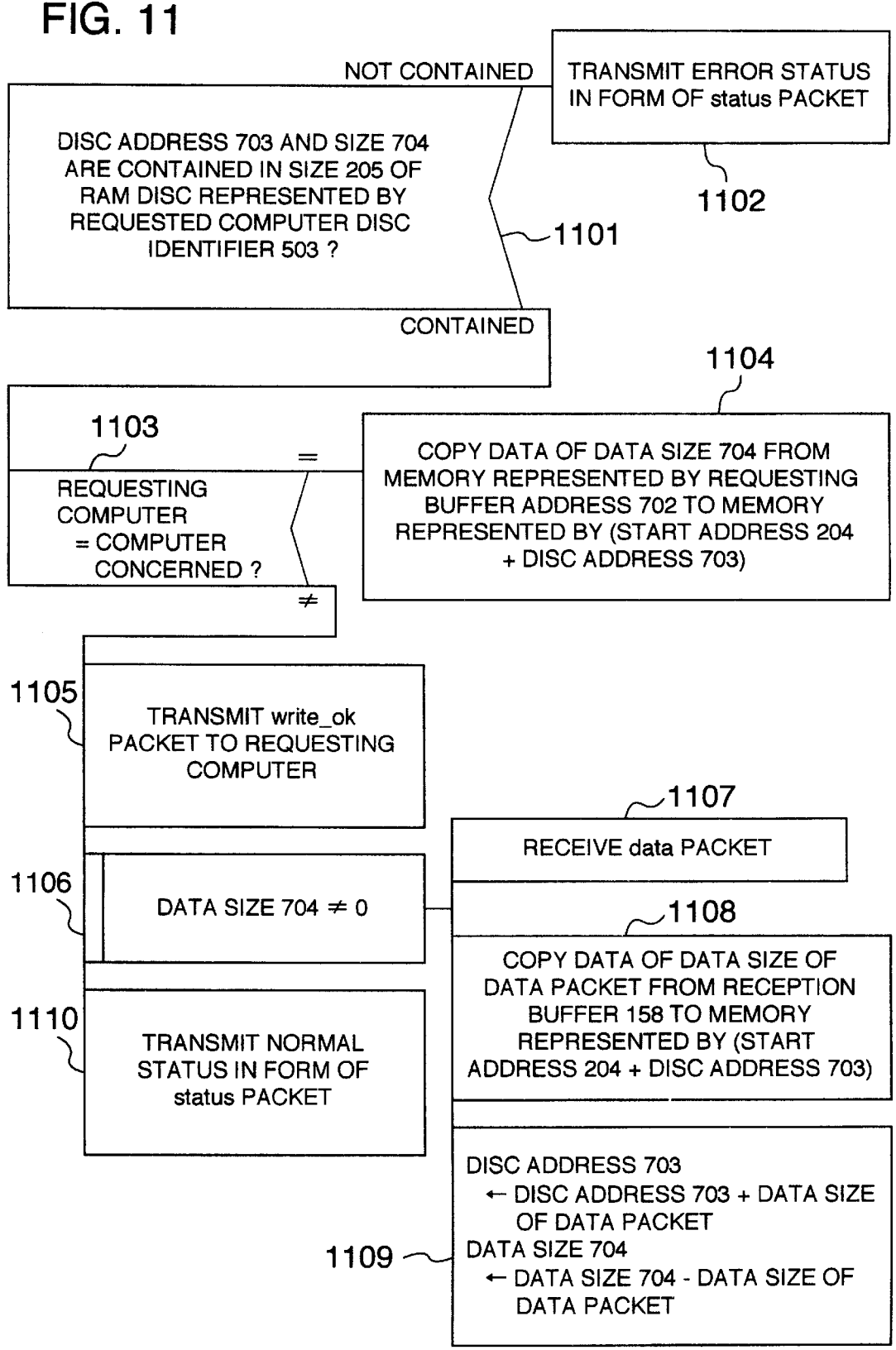
FIG. 11 is a PAD diagram showing the processing flow of the write processing in the RAM disc command processing block 153.

FIG. 11 is a PAD diagram showing the processing flow of the write processing in the RAM disc command processing block 153 of the present embodiment. The processings in Steps 1101 and 1102 are the same as those in Steps 1001 and 1002 which have been described with reference to FIG. 10, i.e., the processings of checking the area in such a way that the transfer data 724 is not written to the memory area other than the RAM disc area to which the write request is made.

After completion of the area check, in Step 1103, it is judged whether or not the requesting computer ID 501 is the computer ID of the computer concerned.

If it is judged in Step 1103 that the requesting computer ID 501 exhibits the computer ID of the computer concerned, then similarly to Step 1004 in the read processing, the contents of the memory 120 may be copied within the computer concerned. More specifically, in Step 1104, the data of the data size 704 is copied from the address represented by the requesting buffer address 702 to the address represented by (the start address 204+ the disc address 703).

On the other hand, if it is judged in Step 1103 that the requesting computer ID 501 does not exhibit the computer ID of the computer concerned, then since the data relating to the contents of the RAM disc is transferred to any of other computers, the processings in and after Step 1105 are executed.

The processings in and after Step 1105 are also, similarly to the read processing, the processings for coping with the maximum length of the network packet 600. That is, in Step 1105, first of all, the "write-ok" packet is transmitted to the requesting computer represented by the requesting computer ID 501.

By transmitting this packet, the preparations for the data transfer are made between the requesting computer and the requested computer. At the time when the requesting computer has received the "write-ok" packet, the data transfer is started from the requesting computer. The processing executed by the requesting computer will be described in detail later with reference to FIG. 14.

The processings from Step 1106 to Step 1109 exhibit the processing of receiving the data from the requesting computer. Then, for a time period when in Step 1106, the data size 704 has any one of numerals other than "0", the processings in Steps 1107 to 1109 are executed.

In Step 1107, the "data" packet from the requesting computer is received. If the "data" packet does not arrive, then waiting is carried out.

After having received the "data" packet in Step 1107, next, in Step 1108, the data of the data size 723 of the "data" packet is copied from the reception buffer 158 to the address represented by (the start address 204+ the disc address 703).

Next, in Step 1109, in order to execute the next reception processing, the disc address 703 is increased by the data size 723 of the "data" packet thus received, and also the data size 704 is decreased by the data size 723 of the "data" packet thus received.

By executing repeatedly the processings from Step 1107 to Step 1109, the data can be written to the RAM disc. Finally, in Step 1100, the requesting computer is informed of that the reception processing has been completed.

Figure 12:
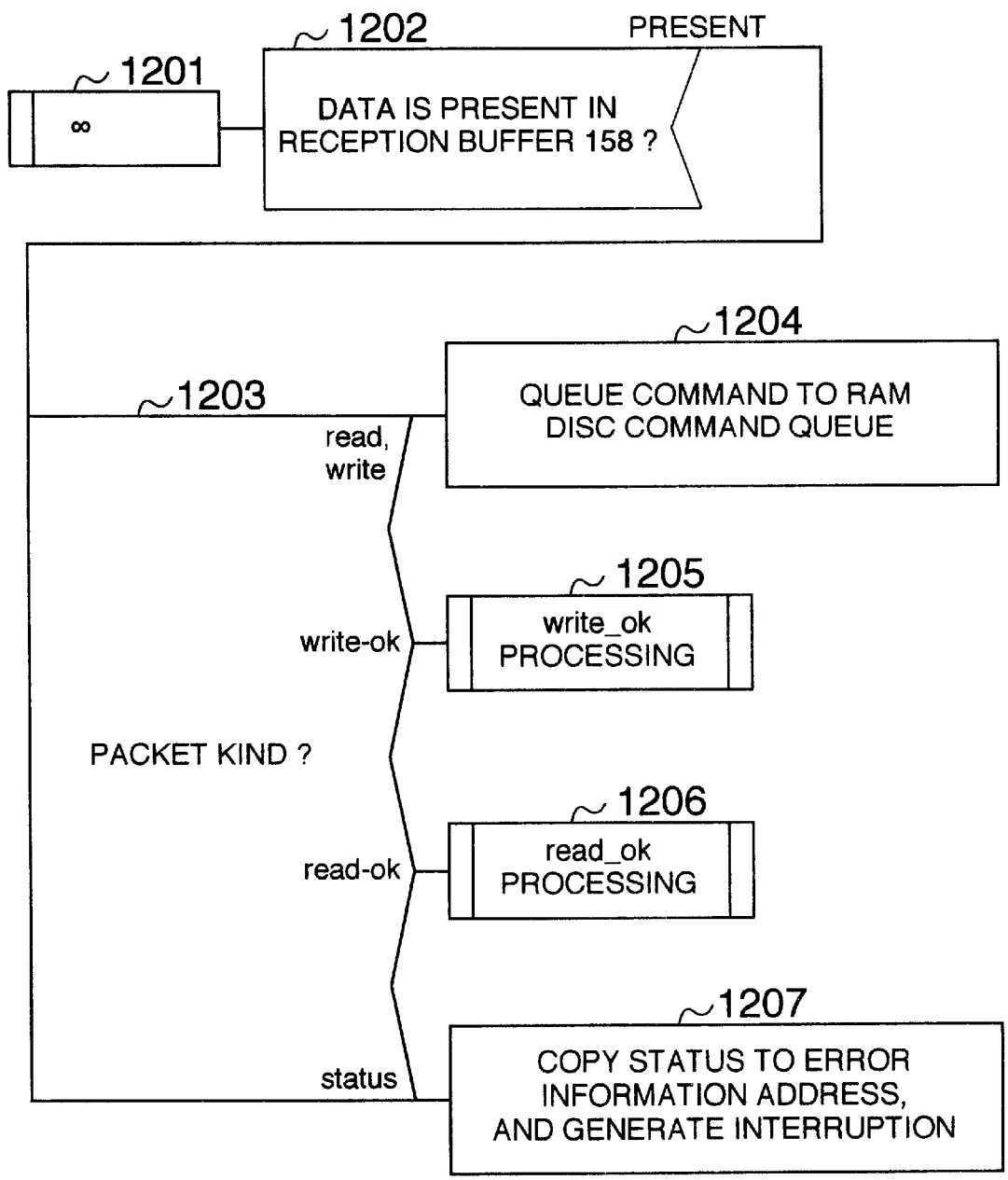
FIG. 12 is a PAD diagram showing the processing flow in a network transmission/reception processing block 154.

FIG. 12 is a PAD diagram showing the processing flow in the network transmission/reception processing block 154 of the present embodiment. As shown in Step 1201, the network transmission/reception processing block 154 includes the infinite loop of the processings shown in and after Step 1202.

In Step 1202, it is judged whether or not the network packet 600 has arrived at the reception buffer 158. If it is judged in Step 1202 that the network packet 600 has already arrived at the reception buffer 158, then the processing of judgement of the kind of packet is executed in Step 1203.

If it is judged in Step 1203 that the kind of packet is "read" or "write", then since the network packet 600 of interest exhibits the request to read out or write data from or to the RAM disc which is managed by the network interface 150, in Step 1204, the network packet 600 is queued as the RAM disc command 500 to the RAM disc command queue 155 of the network interface 150. The RAM disc command 500 which has been queued thereto is processed in the RAM disc command processing block 153 which has already been described with reference to FIGS. 9 to 11.

Next, if it is judged in Step 1203 that the kind of packet is "write-ok" or "read-ok", as shown in Step 1205 or Step 1206, respectively, the "write-ok" processing or the "read-ok" processing is executed.

The "write-ok" processing and the "read-ok" processing will be described later in detail with reference to FIG. 13 and FIG. 14, respectively.

On the other hand, if it is judged in Step 1203 that the kind of packet is "status", then the processing proceeds to Step 1207. Then, the status 732 of the "status" packet is returned back to the error information storing address 303 corresponding to the sequence number 605 of the network packet 600, an interruption is generated in the processor 110 through the bus bridge 159, and the user program is informed of that the "read" or "write" command has been completed.

Figure 13:
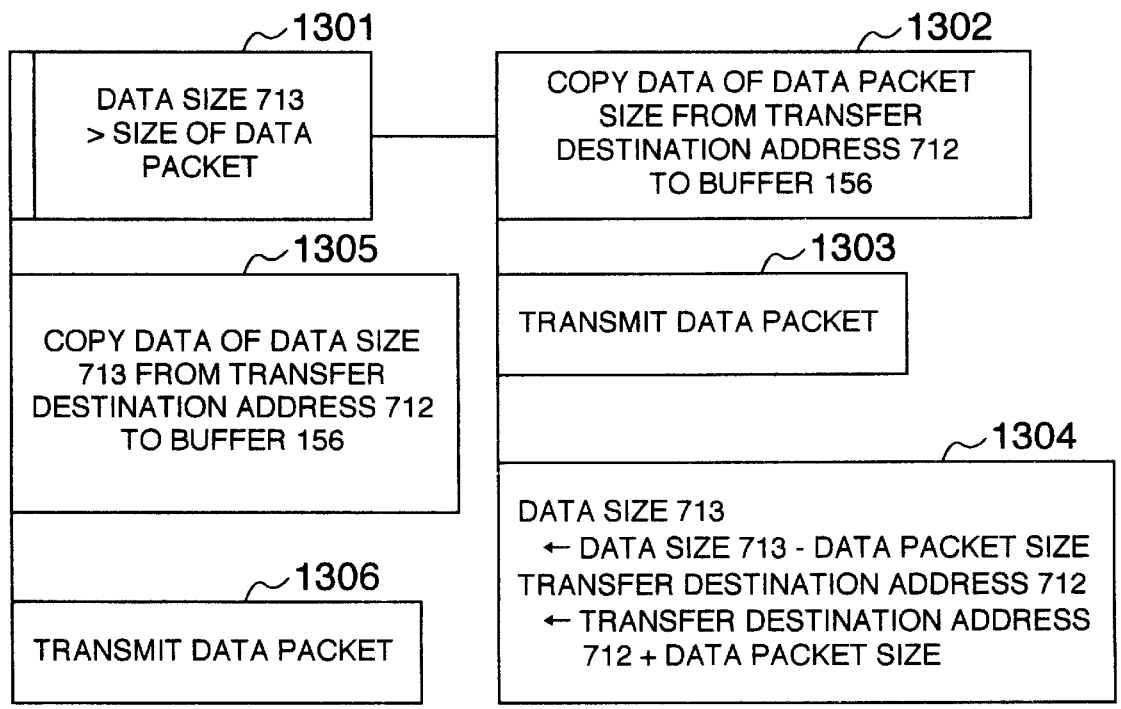
FIG. 13 is a PAD diagram showing the processing flow of the processing when the network transmission/reception processing block 154 receives a "write-ok" packet.

FIG. 13 is a PAD diagram showing the processing flow of the processing, when receiving the "write-ok" packet, in the network transmission/reception processing block 154 of the present embodiment. When receiving "write-ok" packet, since the packet of interest means that the requested computer is in a state of being able to receive the data, as shown in Steps 1301 to 1306, the data is transferred in the form of a plurality of "data" packets.

First of all, in Step 1301, it is judged whether or not the data size 713 to be transferred is larger than the maximum length of the "data" packet. If it is judged in Step 1301 that the data size 713 is larger than the maximum length of the "data" packet, then the processings in Steps 1302 to 1304 are executed.

In Step 1302, first of all, the contents of the data size 723 of the "data" packet are copied from the transfer destination address 712 to the transmission buffer 156, the transfer destination address 712 is set in the transfer destination address 722, and in Step 1303, the data relating to the copied contents is transferred in the form of the "data" packet to the requested computer. Next, in Step 1304, the values of the transfer destination address 712 and the data size 713 are changed by the data size 723 of the "data" packet which has been transmitted.

By executing repeatedly the processings from Step 1302 to Step 1304, it is possible to transfer the data which is larger than the maximum length of the "data" packet.

In addition, in Step 1305, the contents of the data size 713 to be transferred are copied from the transfer destination address 712 to the transmission buffer 156, the transfer destination address 712 is set in the transfer destination address 722, and the data size 713 is set in the data size 723, and also in Step 1306, the data relating to the copied contents is transferred in the form of the "data" packet to the requested computer.

Figure 14:
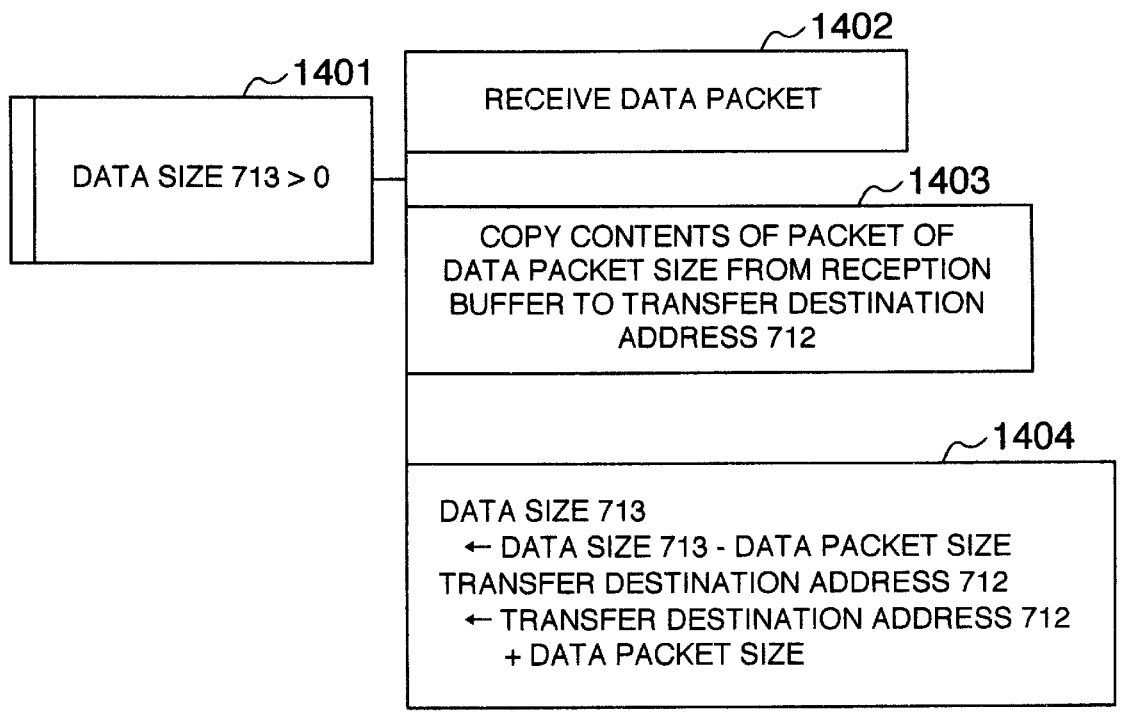
FIG. 14 is a PAD diagram showing the processing flow of the processing when the network transmission/reception processing block 154 receives a "read-ok" packet.

FIG. 14 is a PAD diagram showing the processing flow of the processing, when receiving the "read-ok" packet, in the network transmission/reception block 154 of the present embodiment. When receiving the "read-ok" packet, since the packet of interest means that the requested computer is in a state of being able to transmit the transfer data 724, as shown in Steps 1401 to 1404, the transfer data 724 is received in the form of a plurality of "data" packets.

First of all, in Step 1401, for a time period when the data size 713 has any one of the numerals other than "0", the processings in Steps 1402 to 1404 are executed.

In Step 1402, the "data" packet from the requested computer is received. If the "data" packet has not yet arrived, then the waiting is carried out.

In Step 1402, if the "data" packet is received, next, in Step 1403, the transfer data 724 of the "data" packet is copied, for the data size 723 from the reception buffer 158 to the transfer destination address 712.

Next, in Step 1404, in order to execute the next reception processing, the transfer destination address 712 is increased by the data size 723 of the "data" packet which has been received, and also the data size 713 is decreased by the data size 723 of the "data" packet thus received.

By executing repeatedly the processings in Steps 1402 to 1404 described above, it is possible to write the data to the RAM disc.

As a result of the above-mentioned processings, since the RAM disc seems to be present on the network interface 150, the RAM disc of interest can be shared by a plurality of computers, and also since the processing of accessing to the RAM disc is realized on the network interface 150, the load on the processor 110 of the computer 100 can be reduced. In addition, it is possible to separate the request of accessing from the computer concerned to the RAM disc from the request of accessing thereto from another computer.

By the two means, both of the access from the computer concerned and the access from another computer can be processed, and also the access to the RAM disc of the computer concerned can be efficiently carried out.

As described above, according to the memory disc share system of the present embodiment, since under the control made by the network interface apparatus, the data of the memory disc is transferred without through the buffer area within the main memory, it is possible to enhance the efficiency of transferring the data in the memory disc which a plurality of computers share.

In addition, according to the memory disc share system of the present embodiment, since on the basis of the information in the memory disc structure information holding block, the memory disc of the computer concerned is accessed without through the network, when the memory disc of the computer concerned is shared by a plurality of computers, it is possible to enhance the efficiency of accessing to the memory disc included in the computer concerned.

In addition, according to the memory disk share system of the present embodiment, after the instruction to execute the processing of reading out/writing data and the data have been separated and then the instruction to execute the processing of reading out/writing data is issued, the data is transferred. Therefore, it is possible to suppress the buffer amount which becomes necessary on the network interface apparatus when transferring the data between the memory disc of the computer concerned and the requesting computer.

In addition, according to the memory disk share system of the present embodiment, since the processing of reading out/writing data from/to the memory disc in the computer concerned can be executed without carrying out buffering on the main memory, it is possible to suppress the processing load on the computer concerned and also to save the memory capacity of the main memory.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A memory disc sharing method of sharing a memory disc by a plurality of computers through a network, said method executed in a computer comprising the steps of:

accepting a command, in accordance with which the memory disc is accessed, at a network interface apparatus;

determining whether the command is directed to the computer concerned or other computers;

transmitting, when a requested computer to which a request of the command has been made is any of other computers, the command to the any of other computers;

executing, when a requested computer to which the request of the command has been made from the computer concerned is the computer concerned, the processing of reading out/writing data from/to the memory disc in the computer concerned; and carrying out, when a requesting computer from which a request has been made is any of other computers, the data transfer between the memory disc of the computer concerned and the requesting computer.

2. A memory disc sharing method according to claim 1, further comprising the steps of:

holding memory disc structure information exhibiting in which computer the memory disc which is accessed in accordance with the command is present; and judging, by making reference to the memory disc structure information, whether the memory disc which is accessed in accordance with the command is present in the computer concerned or any of other computers.

3. A memory disc sharing method according to claim 2, wherein when the memory disc which is accessed in accordance with the command is present in the computer concerned, the accepted command is stored in a memory disc command queue for storing therein the command, and when the memory disc which is accessed in accordance with the command is present in any of other computers, the accepted command is transmitted to the any of other computers.

4. A memory disc sharing method according to claim 2, wherein a plurality of memory discs are present in the computer to which the command has been issued, and information used to identify the plurality of memory discs is contained in the memory disc structure information.

5. A memory disc sharing method according to claim 1, wherein when the requesting computer from which the request of the command has been made is any of other computers, the data of a network packet to instruct to execute the processing of reading out/writing data and a network packet in the form of which data is transferred are transferred between the memory disc of the computer concerned and the requesting computer.

6. A memory disc sharing method according to claim 1, wherein when the requesting computer from which the request of the command has been made is the computer concerned, the processing of reading out/writing data from/to the memory disc in the computer concerned is executed between the memory disc in the computer concerned and a buffer of a host apparatus from which the command has been issued.

7. A network interface apparatus of a system for sharing a memory disc by a plurality of computers through a network, said apparatus comprising:

command acceptance means for accepting a command in accordance with which the memory disc is accessed;

transmission/reception processing means for transmitting, when the requested computer to which a request of the command has been made is any of other computers, the command to the any of other computers; and disc command processing means for executing, when the requested computer to which the request of the command has been made from the computer concerned is the computer concerned, the processing of reading out/writing data from/to the memory disc in the computer concerned, wherein when the requested computer to which the request of the command has been made is the computer concerned and also the requesting computer from which the request has been made is any of other computers, said transmission/reception processing means carries out the data transfer between the memory disc of the computer concerned and the requesting computer from which the request has been made.

8. A network interface apparatus according to claim 7, further comprising memory disc structure information holding means for exhibiting in which computer the memory disc which is accessed in accordance with the command is present, wherein said network interface apparatus makes reference to the contents of said memory disc structure information holding means to judge whether the memory disc which is accessed in accordance with the command is present in the computer concerned or any of other computers.

9. A network interface apparatus according to claim 8, wherein a plurality of memory discs are present in the computer to which the command has been issued, and information with respect to said plurality of memory discs is contained in said memory disc structure information holding means.

10. A network interface apparatus according to claim 8, wherein when the memory disc which is accessed in accordance with the command is present in the computer concerned, the accepted command is stored in a memory disc command queue for storing therein the command, and when the memory disc which is accessed in accordance with the command is present in any of other computers, said transmission/reception processing means transmits the accepted command to the any of other computers.

11. A network interface apparatus according to claim 7, wherein when the requesting computer from which the request of the command has been made is any of other computers, said transmission/reception processing means transfers the data of a network packet to instruct to execute the processing of reading out/writing data and a network packet in the form of which data is transferred between the memory disc of the computer concerned and the requesting computer.

12. A network interface apparatus according to claim 7, wherein when the requesting computer from which the request of the command has been made is the computer concerned, the processing of reading out/writing data from/to the memory disc in the computer concerned is executed between the memory disc in the computer concerned and a buffer of a host apparatus from which the command has been issued.

13. A memory disc share system for sharing a memory disc by a plurality of computers through a network, said system comprising: a memory disc; and a network interface apparatus, said network interface apparatus comprising:

command acceptance means for accepting a command in accordance with which the memory disc is accessed;

transmission/reception processing means for transmitting, when the requested computer to which a request of the command has been made is any of other computers, the command to the any of other computers; and disc command processing means for executing, when the requested computer to which the request of the command has been made from the computer concerned is the computer concerned, the processing of reading out/writing data from/to the memory disc in the computer concerned, wherein when the requested computer to which the request of the command has been made is the computer concerned and also the requesting computer from which the request has been made is any of other computers, said transmission/reception processing means carries out the data transfer between the memory disc of the computer concerned and the requesting computer from which the request has been made.

14. A network interface apparatus according to claim 13, further comprising memory disc structure information holding means for exhibiting in which computer the memory disc which is accessed in accordance with the command is present, wherein said network interface apparatus makes reference to the contents of said memory disc structure information holding means to judge whether the memory disc which is accessed in accordance with the command is present in the computer concerned or any of other computers.

15. A network interface apparatus according to claim 14, wherein a plurality of memory discs are present in the computer to which the command has been issued, and information with respect to said plurality of memory discs is contained in said memory disc structure information holding means.

16. A network interface apparatus according to claim 14, wherein when the memory disc which is accessed in accordance with the command is present in the computer concerned, the accepted command is stored in a memory disc command queue for storing therein the command, and when the memory disc which is accessed in accordance with the command is present in any of other computers, said transmission/reception processing means transmits the accepted command to the any of other computers.

17. A memory disc share system according to claim 13, wherein when the requesting computer from which the request of the command has been made any of other computers, said transmission/reception processing means transfers the data of a network packet to instruct to execute the processing of reading out/writing data and a network packet in the form of which data is transferred between the memory disc of the computer concerned and the requesting computer.

18. A memory disc share system according to claim 13, further comprising: a processor; and a memory, wherein when the requesting computer from which the request of the command has been made is the computer concerned, said processor executes the processing of reading out/writing data from/to the memory disc in the computer concerned between the memory disc and said memory.

19. A computer-readable storage medium having a program stored therein, said program comprising the steps of:

accepting an command in accordance with which a memory disc is accessed;

transmitting, when a requested computer to which a request of the command has been made is any of other computers, the command to the any of other computers;

executing, when a requested computer to which a request of the command has been made from a computer concerned is the computer concerned, the processing of reading out/writing data from/to a memory disc in the computer concerned; and carrying out, when a requesting computer from which a request has been made is any of other computers, the data transfer between the memory disc of the computer concerned and the requesting computer from which a request has been made.

* * * * *